US011941121B2

(12) United States Patent
Briliauskas et al.

(10) Patent No.: US 11,941,121 B2
(45) Date of Patent: Mar. 26, 2024

(54) SYSTEMS AND METHODS FOR DETECTING MALWARE USING STATIC AND DYNAMIC MALWARE MODELS

(71) Applicant: UAB 360 IT, Vilnius (LT)

(72) Inventors: Mantas Briliauskas, Vilnius (LT); Aleksandr Ševčenko, Vilnius (LT)

(73) Assignee: UAB 360 IT, Vilnius (LT)

(*) Notice: Subject to any disclaimer, the term of this patent is extended or adjusted under 35 U.S.C. 154(b) by 310 days.

(21) Appl. No.: 17/563,738

(22) Filed: Dec. 28, 2021

(65) Prior Publication Data

US 2023/0205878 A1 Jun. 29, 2023

(51) Int. Cl.
*G06F 21/56* (2013.01)
*G06F 18/214* (2023.01)

(52) U.S. Cl.
CPC ........ *G06F 21/566* (2013.01); *G06F 18/2148* (2023.01); *G06F 21/562* (2013.01); *G06F 21/565* (2013.01); *G06F 2221/034* (2013.01)

(58) Field of Classification Search
CPC .. G06F 21/566; G06F 18/2148; G06F 21/562; G06F 21/565; G06F 2221/034
See application file for complete search history.

(56) References Cited

U.S. PATENT DOCUMENTS

| | | | | |
|---|---|---|---|---|
| 8,769,702 B2* | 7/2014 | Hulten | ..................... | G06F 21/56 379/70 |
| 9,223,972 B1* | 12/2015 | Vincent | ............... | H04L 63/1425 |
| 9,262,635 B2* | 2/2016 | Paithane | ................ | G06F 21/53 |
| 9,485,272 B1* | 11/2016 | Roundy | .................. | H04L 63/14 |
| 10,192,052 B1* | 1/2019 | Singh | ..................... | G06F 21/562 |
| 10,193,902 B1* | 1/2019 | Caspi | ..................... | G06F 21/564 |
| 10,366,231 B1* | 7/2019 | Singh | ...................... | G06F 21/56 |
| 10,395,029 B1* | 8/2019 | Steinberg | ................ | G06F 21/53 |
| 10,437,999 B1* | 10/2019 | Bhattacharyya | ........ | G06F 16/13 |
| 10,511,617 B2* | 12/2019 | Zou | ..................... | H04L 63/1425 |
| 10,515,214 B1* | 12/2019 | Vincent | ................ | G06F 21/562 |
| 10,681,080 B1* | 6/2020 | Chen | ..................... | G06F 21/562 |
| 10,885,188 B1* | 1/2021 | Batur | ..................... | G06F 21/565 |
| 10,929,534 B2* | 2/2021 | Chistyakov | ............ | G06N 20/00 |
| 11,003,773 B1* | 5/2021 | Fang | ..................... | H04L 63/0263 |
| 11,005,860 B1* | 5/2021 | Glyer | .................. | H04L 63/1433 |
| 11,170,104 B1* | 11/2021 | Stickle | ................... | G06N 20/00 |
| 11,295,015 B1* | 4/2022 | Roundy | ............... | G06F 21/567 |

(Continued)

*Primary Examiner* — Darren B Schwartz
(74) *Attorney, Agent, or Firm* — Meunier Carlin & Curfman LLC

(57) ABSTRACT

In an embodiment, systems and methods for detecting malware are provided. A server trains a static malware model and a dynamic malware model to detect malware in files. The models are distributed to a plurality of user devices for use by antimalware software executing on the user devices. When a user device receives a file, the static malware model is used to determine whether the file contains malware. If the static malware model is unable to make the determination, when the file is later executed, the dynamic malware model is used to determine whether the file contains malware. The file along with the determination made by the dynamic malware model are then provided to the server. The server then retrains the static malware model using the received files and the received determinations. The server then distributes the updated static malware model to each of the devices.

14 Claims, 6 Drawing Sheets

(56) References Cited

U.S. PATENT DOCUMENTS

| | | | |
|---|---|---|---|
| 11,381,580 B2* | 7/2022 | Luan | G06N 20/00 |
| 11,461,462 B1* | 10/2022 | Lan | G06F 21/56 |
| 11,558,401 B1* | 1/2023 | Vashisht | G06F 21/56 |
| 11,599,635 B2* | 3/2023 | More | G06F 21/554 |
| 2007/0079379 A1* | 4/2007 | Sprosts | H04L 63/145 |
| | | | 726/24 |
| 2007/0152854 A1* | 7/2007 | Copley | G06F 21/554 |
| | | | 341/51 |
| 2007/0240217 A1* | 10/2007 | Tuvell | H04L 63/145 |
| | | | 713/188 |
| 2007/0240222 A1* | 10/2007 | Tuvell | H04W 12/128 |
| | | | 726/24 |
| 2010/0031353 A1* | 2/2010 | Thomas | G06F 21/563 |
| | | | 718/1 |
| 2010/0064369 A1* | 3/2010 | Stolfo | G06F 21/566 |
| | | | 726/24 |
| 2010/0162400 A1* | 6/2010 | Feeney | G06F 21/563 |
| | | | 726/24 |
| 2010/0192222 A1* | 7/2010 | Stokes | G06F 21/563 |
| | | | 703/23 |
| 2012/0005751 A1* | 1/2012 | Chen | H04L 63/1416 |
| | | | 726/25 |
| 2012/0317644 A1* | 12/2012 | Kumar | G06F 21/552 |
| | | | 726/24 |
| 2012/0323829 A1* | 12/2012 | Stokes | G06F 18/2323 |
| | | | 706/50 |
| 2014/0090061 A1* | 3/2014 | Avasarala | G06F 21/566 |
| | | | 726/24 |
| 2014/0096248 A1* | 4/2014 | Hay | G06F 21/561 |
| | | | 726/23 |
| 2014/0123279 A1* | 5/2014 | Bishop | H04L 63/145 |
| | | | 726/23 |
| 2014/0208426 A1* | 7/2014 | Natarajan | G06F 21/562 |
| | | | 726/23 |
| 2015/0089647 A1* | 3/2015 | Palumbo | G06F 21/564 |
| | | | 726/23 |
| 2015/0096022 A1* | 4/2015 | Vincent | G06F 21/562 |
| | | | 726/23 |
| 2015/0180890 A1* | 6/2015 | Ronen | H04L 63/1416 |
| | | | 726/23 |
| 2015/0244732 A1* | 8/2015 | Golshan | H04L 63/145 |
| | | | 726/23 |
| 2015/0310212 A1* | 10/2015 | Green | H04L 63/145 |
| | | | 726/24 |
| 2016/0092684 A1* | 3/2016 | Langton | H04L 63/1433 |
| | | | 726/23 |
| 2016/0173510 A1* | 6/2016 | Harris | H04L 63/20 |
| | | | 726/23 |
| 2016/0248786 A1* | 8/2016 | Ylipekkala | H04L 63/145 |
| 2017/0337376 A1* | 11/2017 | Reader | G06F 21/568 |
| 2018/0039779 A1* | 2/2018 | Li | G06F 21/56 |
| 2018/0137282 A1* | 5/2018 | Rasanen | G06F 21/566 |
| 2018/0139216 A1* | 5/2018 | Rasanen | H04L 63/1416 |
| 2019/0050567 A1* | 2/2019 | Chistyakov | G06F 21/563 |
| 2019/0050571 A1* | 2/2019 | Rhee | G06F 21/552 |
| 2020/0293655 A1* | 9/2020 | Long | G06N 20/00 |
| 2022/0067146 A1* | 3/2022 | Cai | G06F 21/566 |
| 2022/0414209 A1* | 12/2022 | Strogov | G06F 21/566 |

* cited by examiner

11,941,121 B2

SYSTEMS AND METHODS FOR DETECTING MALWARE USING STATIC AND DYNAMIC MALWARE MODELS

BACKGROUND

Malware is a type of malicious software that intentionally harms a computer or network environment where it is located. Malware can be hidden in virtually any type of file making detecting and eliminating malware difficult.

Antimalware software is used to detect and eliminate malware, ideally before it is opened or executed by a user of a computing device. One such method is through the use of static machine learning models. These models take as an input features that are extracted from a file before it is executed and predict whether or not a file is malware. If a file is predicted to be malware, a user or administrator can be alerted before they run the file.

One drawback associated with static malware models is that they require a large amount of labeled training data to adequately train. Generating and collecting such training data can be time consuming and expensive. Second, malicious actors and entities are continuously developing new ways to mask the presence of malware in files, requiring the static malware models to be continuously updated and retrained to remain effective. However, such updating requires continuous sources of new training data and additional resources to distribute the updated static malware models.

SUMMARY

In an embodiment, systems, methods, and computer-readable mediums for detecting malware are provided. A server initially trains a static malware model and a dynamic malware model to detect malware in files. The static and dynamic malware models are distributed to a plurality of user devices for use by antimalware software executed on the user devices. When a user device receives a file, the static malware model is used to determine whether a file does or does not contain malware. If the static malware model is unable to make the determination, when the file is later executed, the dynamic malware model is used to determine whether the file does or does not contain malware. The file along with the determination made by the dynamic malware model is then provided to the server by the user device. The server may then retrain the static malware model using the received files and the received determinations made by the dynamic malware models executing on the user devices. The server may then distribute the retrained and updated static malware models to each of the user devices.

In an embodiment, a method for detecting malware in files is provided. The method includes: receiving a file by a computing device; determining a first probability that the file is malware using a first malware model, wherein the first malware model is a static malware model; based on the determined first probability, determining a malware status of the file by the computing device, wherein the malware status is one of malware, not malware, or inconclusive; and if malware status of the file is inconclusive: executing the file by the computing device; and determining a second probability that the file is malware based on the execution of the file using a second malware model by the computing device, wherein the second malware model is a dynamic malware model.

Embodiments may include some or all of the following features. The method may further include: providing at least a portion of the file and the second probability to a server through a network by the computing device. Providing the file and the second probability to the server through the network may include: extracting features from the file; and providing the extracted features from the file and the second probability to the server through the network. The method may further include receiving an updated version of the first model from the server, wherein the updated version of the first model was trained using the file and the second probability. The first probability may be determined in response to one or more of receiving the file and detecting that the user has selected the file. The method may further include, if the malware status of the file is malware, alerting a user. Executing the file by the computing device may include receiving an indication to execute the file from the user and executing the file in response to the indication. Determining the malware status of the file may include: if the first probability is below a first threshold and below a second threshold, determining that the malware status is not malware; if the first probability is above the first threshold and below the second threshold, determining that the malware status is inconclusive; if the probability is above the first threshold and above the second threshold, determining that the malware status is malware.

In an embodiment, a system for detecting malware in files is provided. The system includes at least one computing device; and a computer-readable medium storing computer-executable instructions that when executed by the at least one computing device cause the at least one computing device to: receive a file; determine a first probability that the file is malware using a first malware model, wherein the first malware model is a static malware model; based on the determined first probability, determine a malware status of the file, wherein the malware status is one of malware, not malware, or inconclusive; and if malware status of the file is inconclusive: execute the file by the computing device; and determine a second probability that the file is malware based on the execution of the file using a second malware model, wherein the second malware model is a dynamic malware model.

Embodiments may include some or all of the following features. The system may further include computer-executable instructions that when executed by the at least one computing device cause the at least one computing device to: provide at least a portion of the file and the second probability to a server through a network by the computing device. Providing the file and the second probability to the server through the network may include extracting features from the file; and providing the extracted features from the file and the second probability to the server through the network. The system may further include computer-executable instructions that when executed by the at least one computing device cause the at least one computing device to receive an updated version of the first model from the server, wherein the updated version of the first model was trained using the file and the second probability. The first probability may be determined in response to one or more of receiving the file and detecting that the user has selected the file. The system may further include computer-executable instructions that when executed by the at least one computing device cause the at least one computing device to: if the malware status of the file is malware, alert a user. Executing the file by the computing device may include receiving an indication to execute the file from the user and executing the file in response to the indication. Determining the malware status of the file may include: if the first probability is below a first threshold and below a second threshold, determining that the malware status is not malware; if the first probability is above the first threshold and below the second threshold, determining that the malware status is inconclusive; and if the probability is above the first threshold and above the second threshold, determining that the malware status is malware.

In an embodiment, a non-transitory computer-readable medium storing computer-executable instructions is provided. The computer-executable instructions when executed by at least one computing device cause the at least one computing device to: receive a file; determine a first probability that the file is malware using a first malware model, wherein the first malware model is a static malware model; based on the determined first probability, determine a malware status of the file, wherein the malware status is one of malware, not malware, or inconclusive; and if malware status of the file is inconclusive: execute the file by the computing device; and determine a second probability that the file is malware based on the execution of the file using a second malware model, wherein the second malware model is a dynamic malware model.

Embodiments may include some or all of the following features. The computer-executable instructions may further include computer-executable instructions that when executed by the at least one computing device cause the at least one computing device to: provide at least a portion of the file and the second probability to a server through a network by the computing device. Providing the file and the second probability to the server through the network may include: extracting features from the file; and providing the extracted features from the file and the second probability to the server through the network. The computer-executable instructions may further include computer-executable instructions that when executed by the at least one computing device cause the at least one computing device to receive an updated version of the first model from the server, wherein the updated version of the first model was trained using the file and the second probability.

In an embodiment, a method for detecting malware in files is provided. The method includes: receiving a first malware model by a computing device from a server through a network, wherein the first malware model was trained using training data provided to the server by a plurality of computing devices including the computing device; determining a first probability that a file stored on the computing device is malware using the first malware model by the computing device; based on the determined first probability, determining a malware status of the file by the computing device, wherein the malware status is one of malware, not malware, or inconclusive; if malware status of the file is inconclusive: determining a second probability that the file is malware using a second malware model by the computing device; and providing at least a portion of the file and the second probability to the server through the network as training data for the first malware model.

Embodiments may include some or all of the following features. The first model may be a static malware model and the second model may be a dynamic malware model. Providing at least a portion of the file and the second probability to the server through the network as training data for the first malware model may include: extracting features from the file; and providing the extracted features from the file and the second probability to the server through the network as training data for the first malware model. The method may further include receiving an updated version of the first model from the server, wherein the updated version of the first model was trained using the extracted features and the second probability. The method may further include: if the malware status of the file is malware, alerting a user. Determining the malware status of the file may include: if the first probability is below a first threshold and below a second threshold, determining that the malware status is not malware; if the first probability is above the first threshold and below the second threshold, determining that the malware status is inconclusive; and if the probability is above the first threshold and above the second threshold, determining that the malware status is malware. The method may further include receiving the second malware model from the server by the computing device through the network.

In an embodiment, a system for detecting malware in files is provided. The system includes: at least one computing device; and a computer-readable medium storing computer-executable instructions that when executed by the at least one computing device cause the at least one computing device to: receive a first malware model from a server through a network, wherein the first malware model was trained using training data provided to the server by a plurality of computing devices including the at least one computing device; determine a first probability that a file stored on the computing device is malware using the first malware model; based on the determined first probability, determining a malware status of the file e, wherein the malware status is one of malware, not malware, or inconclusive; if malware status of the file is inconclusive: determine a second probability that the file is malware using a second malware model; and provide at least a portion of the file and the second probability to the server through the network as training data for the first malware model.

Embodiments may include some or all of the following features. The first model may be a static malware model and the second model may be a dynamic malware model. Providing at least a portion of the file and the second probability to the server through the network as training data for the first malware model may include: extracting features from the file; and providing the extracted features from the file and the second probability to the server through the network as training data for the first malware model. The system may further include computer-executable instructions that when executed by the at least one computing device cause the at least one computing device to: receive an updated version of the first model from the server, wherein the updated version of the first model was trained using the extracted features and the second probability. The system may further include comprising computer-executable instructions that when executed by the at least one computing device cause the at least one computing device to if the malware status of the file is malware, alert a user. Determining the malware status of the file may include: if the first probability is below a first threshold and below a second threshold, determining that the malware status is not malware; if the first probability is above the first threshold and below the second threshold, determining that the malware status is inconclusive; and if the probability is above the first threshold and above the second threshold, determining that the malware status is malware. The system may further include computer-executable instructions that when executed by the at least one computing device cause the at least one computing device to receive the second malware model from the server by the computing device through the network.

In an embodiment, a non-transitory computer-readable medium storing computer-executable instructions is provided. The computer-executable instructions that when executed by at least one computing device cause the at least one computing device to: receive a first malware model from a server through a network, wherein the first malware model was trained using training data provided to the server by a plurality of computing devices including the at least one computing device; determine a first probability that a file stored on the computing device is malware using the first malware model; based on the determined first probability, determining a malware status of the file e, wherein the malware status is one of malware, not malware, or inconclusive; if malware status of the file is inconclusive: determine a second probability that the file is malware using a second malware model; and provide at least a portion of the file and the second probability to the server through the network as training data for the first malware model.

Embodiments may include some or all of the following features. The first model is a static malware model and the second model is a dynamic malware model. Providing at least a portion of the file and the second probability to the server through the network as training data for the first malware model may include: extracting features from the file; and providing the extracted features from the file and the second probability to the server through the network as training data for the first malware model. The computer-executable instructions may further include computer-executable instructions that when executed by the at least one computing device cause the at least one computing device to: receive an updated version of the first model from the server, wherein the updated version of the first model was trained using the extracted features and the second probability. Determining the malware status of the file may include: if the first probability is below a first threshold and below a second threshold, determining that the malware status is not malware; if the first probability is above the first threshold and below the second threshold, determining that the malware status is inconclusive; and if the probability is above the first threshold and above the second threshold, determining that the malware status is malware.

In an embodiment, a method for detecting malware in files is provided. The method includes: receiving a first set of labeled training data by a server, wherein the the first set of training data comprises a plurality files and each file of the plurality of files is labeled as either malware or not malware; training a first malware model using at least some of the first set of training data by the server, wherein the first malware model is a static malware model; training a second malware model using at least some of the first set of training data by the server, wherein the second malware model is a dynamic malware model; and providing the first malware model and the second malware model to each computing device of a plurality of computing devices through a network.

Embodiments may include some or all of the following features. One or more of the plurality of files may be executable files. The method may further include receiving second training data from each computing device of the plurality of computing devices, wherein the second training data received from a computing device comprises a file and a label that was generated for the file by the computing device using the second malware model. The method may further include receiving second training data from each computing device of the plurality of computing devices, wherein the second training data received from a computing device comprises a set of static features extracted from a file by the computing device and a label that was generated for the file by the computing device using the second malware model. The method may further include retraining the first malware model using the second training data. The method may further include providing the retrained first malware model to each computing device of a plurality of computing devices through the network. The method may further include extracting static features from the files of the plurality of files of the first set of training data; and training the first malware model using the extracted static features.

In an embodiment, a system for detecting malware in files is provided. The system includes: a server; and a computer-readable medium storing computer-executable instructions that when executed by the server cause the server to: receive a first set of labeled training data, wherein the first set of training data comprises a plurality files and each file of the plurality of files is labeled as either malware or not malware; train a first malware model using at least some of the first set of training data, wherein the first malware model is a static malware model; train a second malware model using at least some of the first set of training data, wherein the second malware model is a dynamic malware model; and provide the first malware model and the second malware model to each computing device of a plurality of computing devices through a network.

Embodiments may include some or all of the following features. One or more of the plurality of files may be executable files. The system may further include computer-executable instructions that when executed by the server cause the server to receive second training data from each computing device of the plurality of computing devices, wherein the second training data received from a computing device comprises a file and a label that was generated for the file by the computing device using the second malware model. The system may further include computer-executable instructions that when executed by the server cause the server to: receive second training data from each computing device of the plurality of computing devices, wherein the second training data received from a computing device comprises a set of static features extracted from a file by the computing device and a label that was generated for the file by the computing device using the second malware model. The system may further include computer-executable instructions that when executed by the server cause the server to retrain the first malware model using the second training data. The system may further include computer-executable instructions that when executed by the server cause the server to provide the retrained first malware model to each computing device of a plurality of computing devices through the network. The system may further include computer-executable instructions that when executed by the server cause the server to: extract static features from the files of the plurality of files of the first set of training data; and train the first malware model using the extracted static features.

In an embodiment, a computer-readable medium storing computer-executable instructions is provided. The computer-executable instructions when executed by a server cause the server to: receive a first set of labeled training data, wherein the first set of training data comprises a plurality files and each file of the plurality of files is labeled as either malware or not malware; train a first malware model using at least some of the first set of training data, wherein the first malware model is a static malware model; train a second malware model using at least some of the first set of training data, wherein the second malware model is a dynamic malware model; and provide the first malware model and the second malware model to each computing device of a plurality of computing devices through a network.

Embodiments may include some or all of the following features. One or more of the plurality of files may be executable files. The computer-executable instructions may include computer-executable instructions that when executed by the server cause the server to: receive second training data from each computing device of the plurality of computing devices, wherein the second training data received from a computing device comprises a file and a label that was generated for the file by the computing device using the second malware model. The computer-executable instructions may include computer-executable instructions that when executed by the server cause the server to: receive second training data from each computing device of the plurality of computing devices, wherein the second training data received from a computing device comprises a set of static features extracted from a file by the computing device and a label that was generated for the file by the computing device using the second malware model. The computer-executable instructions may include computer-executable instructions that when executed by the server cause the server to retrain the first malware model using the second training data.

In an embodiment, a method for detecting malware in files is provided. The method includes: providing a first malware model to each computing device of a plurality of computing devices through a network by a server; receiving, from each computing device of the plurality of computing devices, training data by the server, wherein the training data identifies a file and an indication of whether the file was determined to be malware or not malware using a second malware model by the computing device; updating the first malware model using at least some of the training data received from the computing devices of the plurality of computing devices; and providing the updated first malware model to each computing device of the plurality of computing devices.

Embodiments may include some or all of the following features. The first malware model may be a static malware model and the second malware model may be a dynamic malware model. The method may further include providing the second malware model to each computing device of the plurality of computing devices through the network by the server. The file may be an executable file. The training data may include the file. The training data may include features extracted from the file by the computing device. The indication of whether the file was determined to be malware or not malware may be a probability that the file is malware.

In an embodiment, a system for detecting malware in files is provided. The system includes: a server; and a computer-readable medium storing computer-executable instructions that when executed by the server cause the server to: provide a first malware model to each computing device of a plurality of computing devices through a network; receive, from each computing device of the plurality of computing devices, training data, wherein the training data identifies a file and an indication of whether the file was determined to be malware or not malware using a second malware model by the computing device; update the first malware model using at least some of the training data received from the computing devices of the plurality of computing devices; and provide the updated first malware model to each computing device of the plurality of computing devices.

Embodiments may include some or all of the following features. The first malware model may be a static malware model and the second malware model may be a dynamic malware model. The system may further include computer-executable instructions that when executed by the server cause the server to provide the second malware model to each computing device of the plurality of computing devices through the network. The file may be an executable file. The training data may include the file. The training data may include features extracted from the file by the computing device. The indication of whether the file was determined to be malware or not malware may be a probability that the file is malware.

In an embodiment, a non-transitory computer-readable medium storing computer-executable instructions is provided. The computer-executable instructions when executed by the server cause the server to: provide a first malware model to each computing device of a plurality of computing devices through a network; receive, from each computing device of the plurality of computing devices, training data, wherein the training data identifies a file and an indication of whether the file was determined to be malware or not malware using a second malware model by the computing device; update the first malware model using at least some of the training data received from the computing devices of the plurality of computing devices; and provide the updated first malware model to each computing device of the plurality of computing devices.

Embodiments may include some or all of the following features. The first malware model may be a static malware model and the second malware model may be a dynamic malware model. The file may be an executable file. The training data may include the file. The training data may include features extracted from the file by the computing device.

The systems, methods, and computer-readable mediums for malware detection provide many advantages over the prior art. First, by moving the creation and collection of training data to each of the user devices, the costs and time associated with creating training data is greatly reduced. Second, because the user devices are continuously providing updated training data based on new files with new types of malware, the static malware models trained using the updated training data are more likely to detect these new types of malware than previous static malware models which were slow to change.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate a malware detection system and method. Together with the description, the figures further serve to explain the principles of the malware detection system and method described herein and thereby enable a person skilled in the pertinent art to make and use the malware detection system and method.

DETAILED DESCRIPTION

Figure 1:
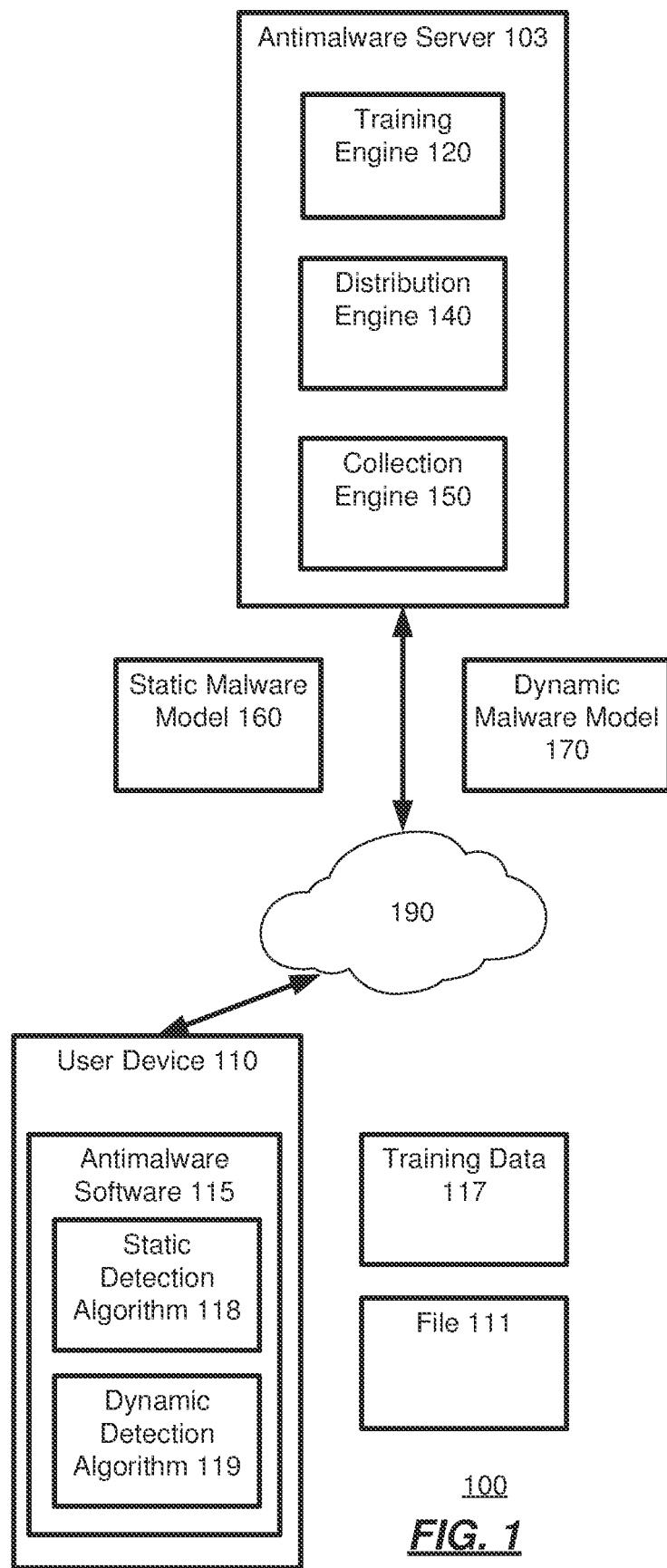
FIG. 1 is an example cloud computing environment for detecting malware in files.

FIG. 1 is an example cloud computing environment 100 for detecting malware in files. As shown, the environment 100 includes an antimalware server 103 in communication with one or more user devices 110 through a network 190. The network 190 may include a combination of public and private networks. Each of the antimalware server 103 and user devices 110 may be implemented using one or more general purpose computing devices such as the computing device 600 illustrated with respect to FIG. 6. Moreover, in some embodiments, the antimalware server 103 may be implemented in a cloud-based computing environment.

The user device 110 may include antimalware software 115 that detects the presence (or absence) of malware in files 111. As shown, the antimalware software 115 uses two algorithms to detect malware in files 111, a static detection algorithm 118 and a dynamic detection algorithm 119. As will be described in further detail below, the static detection algorithm 118 uses a static malware model 160 to detect malware in files 111, and the dynamic detection algorithm 119 uses a dynamic malware model 170. A static malware model 160 is a model that outputs a probability that a file 111 contains or is malware using only static features of the file 111. A dynamic malware model 170 is a model that outputs a probability that a file 111 contains or is malware using dynamic features of the file 111. Both of the models 160 and 170 may be machine learning models trained to identify malware by the antimalware server 103.

The static detection algorithm 118 may use the static malware model 160 to determine a probability that a file 111 contains malware. The static detection algorithm 118 may determine the probability without executing the file 111. In some embodiments, the static detection algorithm 118 may extract a plurality of static features from the file 111 and may use the static malware model 160 to determine the probability that the file 111 includes malware based on the extracted features. The extracted features may include metadata associated with the file 111, the type or application associated with the file 111, the file format descriptions associated with the file 111, code descriptions associated with the file 111, binary data statistics associated with the file 111, and text strings extracted from the file 111.

Other examples of static features include header information, n-gram (byte sequence) repetition counts, code disassembly, Markov models of the binary data, strings; entropy; extracted headers (e.g., MS-DOS stubs, file headers, and optional headers), section tables, relocations, and meta information about each section. Other features may be extracted.

The dynamic detection algorithm 119 may use the dynamic malware model 170 to determine a probability that a file 111 contains malware. Unlike the static detection algorithm 118, the dynamic detection algorithm 119 may first execute the file 111 and may collect dynamic features while the file 111 is executing. These dynamic features may include behaviors, changes, communications or network activity, file or file system activity, operating system API calls (including order, timing, and parameters used), the presence of certain applications or software on the user device 110, traces of instructions or code paths, and events that are detected at the user device 110 due to the execution of the file 111.

Other examples of dynamic features may include environmental features related to where the file 111 is executing (e.g., features relating to machine, platform, OS, installed/running applications, and network) and behavioral features related to actions of the file 111 (e.g., Win API calls and all the information about them, and parent/child/sibling processes API calls). The dynamic features may include sequences of particular API calls and may give indications that the file's actions are malicious. These sequences may be consecutive or may be non-consecutive. For example, a malicious actor may specifically order malicious API calls to include noise and perform other (clean) actions in between API calls to trick the antimalware software.

The dynamic features may further include files accessed, created, or modified by the file 111. For example, the file 111 may try to access, create, modify, rename, delete files (including configuration files, associated with different applications on the user device 110). The file 111 may further create files with names that are predefined in an application library as servicing known viruses, trojan-downloaders, or adware.

As may be appreciated, because executing a file 111 that contains malware has inherent risks to the both the user device 110, and the network 190, when a file 111 is first received or downloaded by the user device 110, the antimalware software 115 may first use the static detection algorithm 118 to determine a probability that the file 111 includes (or does not include malware). If the determined probability shows that that file 111 contains malware, the antimalware software 115 may update a malware status of the file 111 to "malware" and may take one or more actions. These actions may include alerting the user of the user device 110, deleting the file 111, or attempting to clear or remove the malware from the file 111. Depending on the embodiment, the antimalware software 115 may maintain a table, list or other data structure that includes a malware status for each files 111 downloaded, stored, or available to the user device 110.

The determined probability may indicate that the file 111 contains malware when the probability is above a first threshold. The first threshold may be set by a user, administrator, or the static malware model 160 itself.

If the determined probability shows that that file 111 does not contain malware, the antimalware software 115 may update the malware status of the file 111 to "not malware". Later, when a user of the user device 110 attempts to execute or use the file 111, the antimalware software 115 may look up the malware status of the file 111 and may determine that the file 111 is safe to use.

The determined probability may indicate that the file 111 does not contain malware when the probability is below a second threshold. The second threshold may be set by a user, administrator, or the static malware model 160. The second threshold may be less than the first threshold.

In some cases the determined probability for a file 111 by the static detection algorithm 118 may be inconclusive in that it does not clearly indicate whether or not the file 111 is malware or not malware. In such scenarios, the antimalware software 115 may update the malware status of the file 111 to "inconclusive." In addition, the software 115 may alert the user of the user device 110 that the software 115 was unable to determine if the file 111 was or was not malware. The determined probability may be inconclusive when the probability is below the first threshold but above the second threshold.

For a file 111 whose malware status is "inconclusive", at a later time the antimalware software 115 may detect that the user has selected or indicated that they would like to execute the file 111. In response, the antimalware software 115 may invoke the dynamic detection algorithm 119 during the execution of the file 111. The dynamic detection algorithm 119 may collect dynamic features during the execution or use of the file 111 and may use the dynamic malware model 170 to output a probability that the file 111 is malware.

Generally, because the file 111 is executed, the dynamic detection algorithm 119 is likely to generate a probability that strongly indicates that the file 111 does or does not contain malware. Depending on the embodiment, if the probability indicates that the file 111 was or contained malware, the antimalware software 115 may update the malware status of the file 111 to "malware" and may take one or more actions including alerting the user of the user device 110 and cleaning or otherwise attempting to reverse any negative effects on the user device 110 or the network 190 caused by the malware. Depending on the embodiment, because the malware status of the file 111 was inconclusive, the file 111 may be executed in a "sandbox" or a protected and isolated computing environment to prevent the user device 110 from becoming infected by the potential malware.

While the above example uses the dynamic malware model 170 of the dynamic detection algorithm 119 for the file 111 whose malware status is "inconclusive", the dynamic malware model 170 may be used at other times as well. For example, the dynamic malware model 170 may be used on an ongoing basis during execution of every file 111 on the user device 110, inclusive of the files 111 with a malware status of "not malware", on a sampling of the files 111 with a malware status of "not malware", or otherwise periodically be used to scan for dynamic malware features.

In order to help train the static malware model 160 to better identify malware (or non-malware), after the dynamic detection algorithm 119 finishes executing, the antimalware software 115 may generate training data 117 for the static malware model 160. The training data 117 may include the features extracted from the file 111 by the static detection algorithm 118 and the probability generated by the dynamic detection algorithm 119. Alternatively, rather than the probability, the training data 117 may indicate whether or not the dynamic detection algorithm 119 determined the file 111 to include malware. In addition, rather than the extracted static features, the training data 117 may include some or all of the file 111 (or a link to the file 111) in the training data 117.

As will be described further below, the antimalware software 115 may provide the training data 117 to the antimalware server 103, which may use the training data 117 received from the user device 110, along with training data 117 received from other user devices 110, to retrain or update the static malware model 160. The antimalware server 103 may then distribute the retrained and updated static malware model 160 to the various user devices 110. Depending on the embodiment, the antimalware server 103 may also update and redistribute the dynamic malware model 170 to the user devices 110.

The antimalware server 103 may include several components including, but not limited to, a training engine 120, a distribution engine 140, and a collection engine 150. More or fewer components may be supported. Each of the components of the antimalware server 103 may be implemented together or separately using one or more general purpose computing devices such as the computing device 600 illustrated with respect to FIG. 6.

The training engine 120 may train one or both of the static malware model 160 and the dynamic malware model 170 using training data 117. Initially the training data 117 may be training data 117 that was collected and labeled by one or more reviewers. The training data 117 may include sets of features extracted from files 111 that are known to be associated with or include malware and sets of features extracted from files that are known not to be associated with or include malware. The features may be used to train the static malware model 160 and the dynamic malware model 170 using machine learning or other data modeling or predictive analytic techniques. Suitable types of models include neural networks and transformers, for example.

For the static malware model 160, the features used to train the static malware model 160 may include static features (i.e., features that can be extracted from a file 111 without executing the file 111) such as metadata, file type, file format, name, file size, and text strings extracted from the file. Other static features may be considered.

For the dynamic malware model 170, the features used to train the dynamic malware model 170 may include dynamic features (or some combination of static and dynamic features). Dynamic features may be those features that are extracted from a computing environment while the file 111 is executed. Example dynamic features may include behaviors, changes, and events that are detected in the computing environment due to the execution of the file 111.

After the training engine 120 generates the static malware model 160 and dynamic malware models 170, the distribution engine 140 may distribute the generated models through the network 190 to instances of the antimalware software 115 executing on each of a plurality of user devices 110. Each instance of the antimalware software 115 may receive the static malware model 160 and dynamic malware model 170 and may use the static malware model 160 and the dynamic malware model 170 as part of the static detection algorithm 118 and dynamic detection algorithm 119, respectively.

In some embodiments, when a user installs the antimalware software 115 on their user device 110, the static malware model 160 and dynamic malware model 170 may be included in the application package that is installed on the user device 110. Alternatively, after the antimalware software 115 is installed on the user device 110, the antimalware software 115 may download the static malware model 160 and dynamic malware model 170 from the distribution engine 140 through the network 190.

The collection engine 150 may collect and receive training data 117 generated by some or all of the instances of the antimalware software 115 executing on the user devices 110. As described above, when the static malware model 160 used by a particular instance of the antimalware software 115 is unable to conclusively determine whether a file 111 is malware, when the file 1111 is later executed, the dynamic malware model 170 may be used to make the determination. The file 111, and the determination or probability output by the dynamic malware model 170 may then be used as additional training data 117 for the static malware model 160.

In some embodiments, the collection engine 150 may receive the additional training data 117 from each of the instances of the antimalware software 115. For example, after executing a file 111 with an inconclusive malware status, the antimalware software 115 may transmit the training data 117 comprising the file 111 (or static features extracted from the file 111) along with the output of the dynamic malware model 170 to the collection engine 150.

In other embodiments, each instance of the antimalware software 115 may generate and store training data 117 and may transmit the training data 117 to the collection engine 150 in batches. For example, the antimalware software 115 may transmit the training data 117 to the collection engine 150 after the size of the training data 117 reaches a threshold, or after a threshold amount of time has passed since the last set of training data 117 was transmitted to the collection engine 150. Alternatively or additionally, the collection engine 150 may periodically request the training data 117 from each instance of the antimalware software 115 (e.g., every day, week, or month). Each instance of the antimalware software 115 may then transmit its training data 117 in response to the request.

The training engine 120 may use the received training data 117 to retrain or update the static malware model 160. Depending on the embodiment, the training engine 120 may retrain the static malware model 160 in response to the collection engine 150 receiving new training data 117, after some size or amount of training data 117 has been received by the collection engine 150, or after some threshold amount of time has passed since the static malware model 160 was last retrained or updated. In addition, the training engine 120 may retrain the static malware model 160 in response to a request or instruction from a user or administrator.

In some embodiments, the training engine 120 may retrain the static malware model 160 using the training data 117 received from the instances of the antimalware software 150 in combination with some or all of the original training data 117 that was used to train the static malware model 160. The training engine 120 may discard training data 117 that is older than some predetermined age threshold or other pruning criteria.

In some embodiments, the training engine 120 may also retrain and update the dynamic malware model 170. The training engine 120 may update the dynamic malware model 170 similarity as described above for the static malware model 160. Depending on the embodiment, the dynamic malware model 170 may be trained using operating system API call traces and/or instruction (code path) traces extracted from a computing device while running known malware.

The distribution engine 140 may distribute the updated static malware model 160 (and optionally the dynamic malware model 170) to the instances of the antimalware software 115 through the network 190. The instances of the antimalware software 115 may then begin using the updated static malware model 160 in their static detection algorithms 118.

Figure 2:
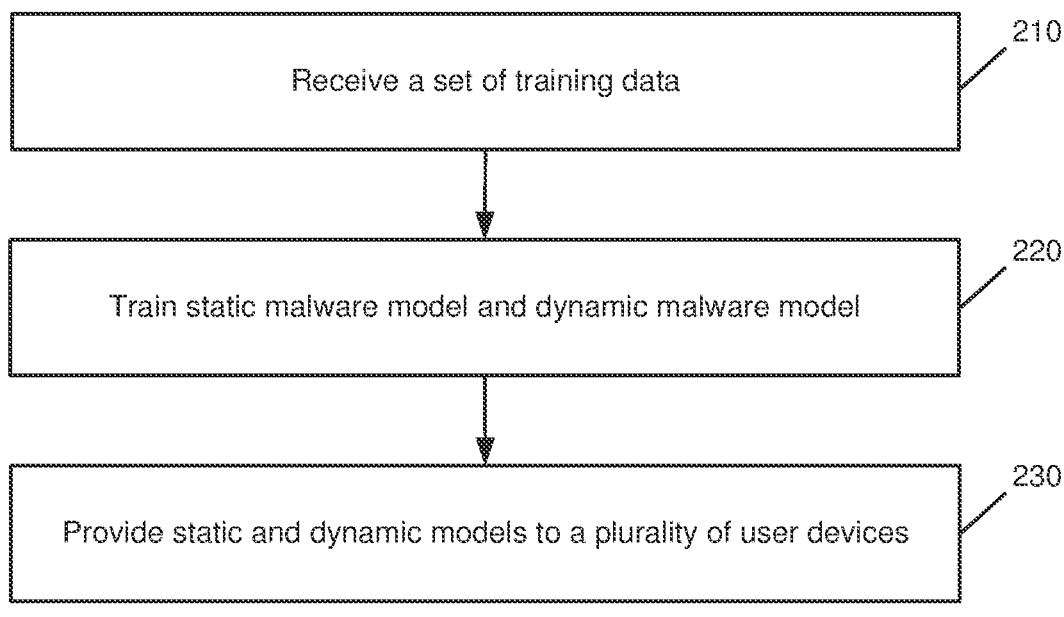
FIG. 2 is an illustration of an example method for training one or more malware models and for distributing the trained malware models to a plurality of user devices.

FIG. 2 is an illustration of an example method for training one or more malware models and for distributing the trained malware models to a plurality of user devices. The method 200 may be implemented by the antimalware server 103.

At 210, a set of training data is received. The set of training data 117 may be received by the training engine 120 of the antimalware server 103. The training data 117 may be labeled training data 117 and may include features extracted/collected from a plurality of files 111 along with a label for each indicating whether or not the file 111 was found to be or include malware. The training data 117 may have been collected and/or generated from a variety of human and non-human reviewers. Depending on the embodiment, the training data 117 may include a first subset for training a static malware model 160 and a second subset for training a dynamic malware model 170.

At 220, malware models are trained using the training data. The malware models may be trained by the training engine 120 of the antimalware server 103. The malware models may include a static malware model 160 and a dynamic malware model 170. The training engine 120 may train the models using machine learning. Other methods for training models may be used.

At 230, the malware models are provided to a plurality of user devices. The malware models may be provided by the distribution engine 140 of the antimalware server 103 to each of the plurality of user devices 110 through the network 190. The user devices may be computing devices and may each run an instance of the antimalware software 115. The antimalware software 115 at each user device 110 may receive and use the received static malware model 160 and dynamic malware model 170 to identify malware in one or more files 111.

Figure 3:
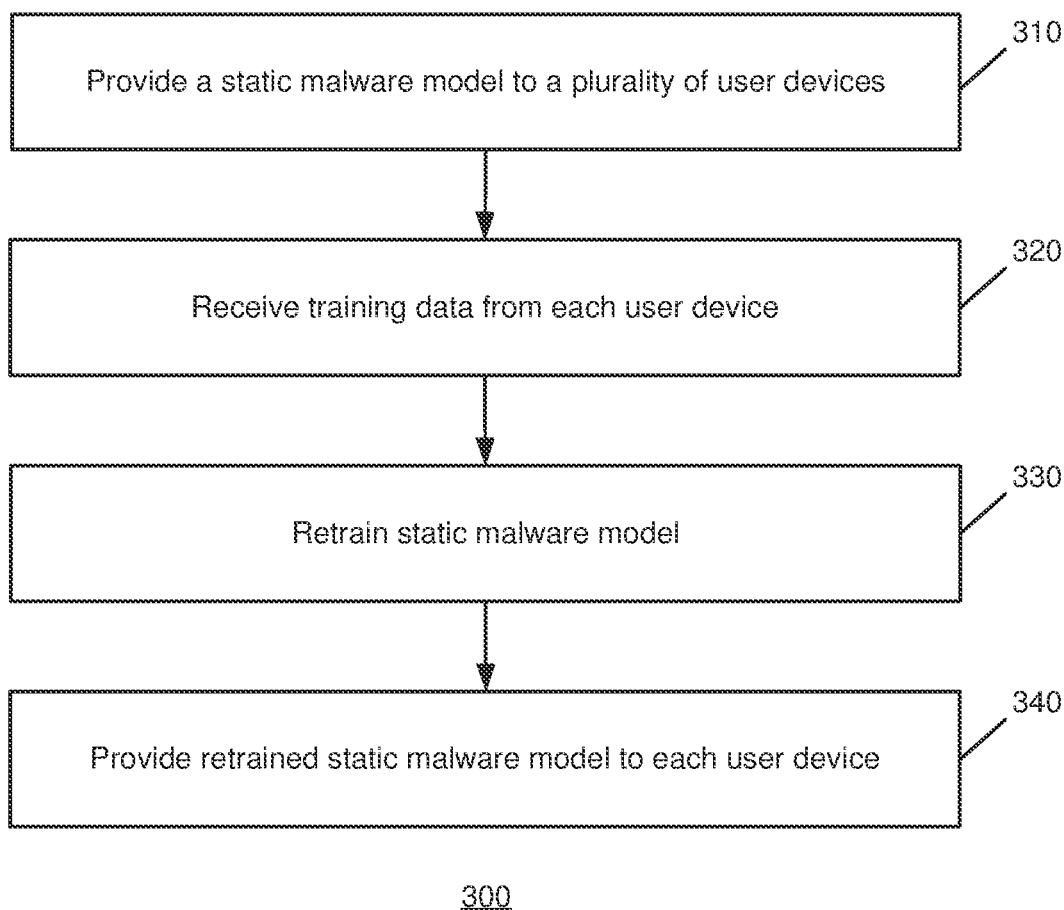
FIG. 3 is an illustration of an example method for retraining one or more malware models based on training data received from a plurality of user devices and for distributing the retrained malware models to the plurality of user devices.

FIG. 3 is an illustration of an example method for retraining one or more malware models based on training data received from a plurality of user devices and for distributing the retrained malware models to the plurality of user devices. The method 300 may be implemented by the antimalware server 103.

At 310, a static malware model is provided to a plurality of user devices. The static malware model 160 may be provided by the distribution engine 140 of the antimalware server 103 to an instance of antimalware software 115 executing on each user device 110 through a network 190. Depending on the embodiment, the distribution engine 140 may also provide a dynamic malware model 170 to the plurality of user devices 110.

At 320, training data is received from each user device. The training data 117 may be received by the collection engine 150 of the antimalware server 103. The training data 117 received from each user device 110 may include a file 111 and a label. The label may be a probability that the file 111 is malware as determined by a dynamic malware model 170. Alternatively, rather than provide each file 111, the training data 117 may include one or more static features extracted from the files 111.

At 330, the static malware model is retrained. The static malware model 160 may be retrained using the received training data 117 from each user device 110 by the training engine 120 of the antimalware server 103.

At 340, the retrained static malware model is provided to each user device. The retrained static malware model 160 may be provided by the distribution engine 140 to each user device 110 through the network 190. Each user device 110 may provide the received updated model 160 to the instance of the antimalware software 115 executing on the user device 110.

Figure 4:
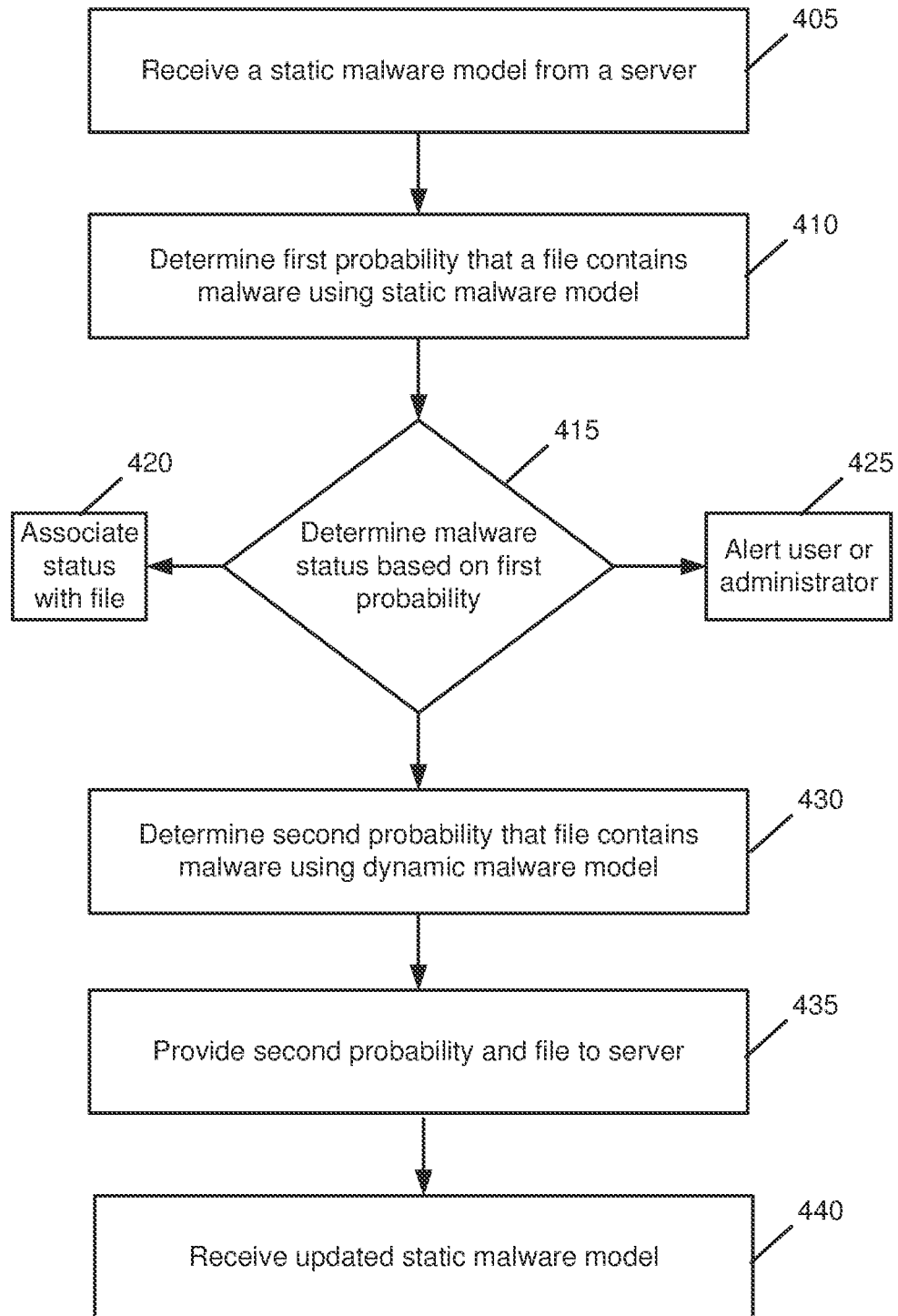
FIG. 4 is an illustration of an example method for detecting malware using a static malware model and a dynamic malware mode and for providing training data to a server.

FIG. 4 is an illustration of an example method for detecting malware using a static malware model 160 and a dynamic malware model 170. The method 400 may be implemented by the antimalware software 115 of a user device 110.

At 405, a static malware model 160 is received from a server. The static malware model 160 may be received by the antimalware software 115 executing on a user device 110 through the network 190.

At 410, a first probability that a file contains malware is determined using the static malware model 160. The first probability may be determined by the static detection algorithm 118 and the received static malware model 160 using static features extracted from the file 111. The file 111 may be a file stored on the user device 110 or that was downloaded by the user device 110.

At 415, a malware status of the file 111 is determined. The malware status may be determined by the antimalware software 115 based on the first probability. If the first probability that the file 111 is malware is above a first threshold, the malware status may be malware, and the method 400 may continue at 425. If the first probability that the file 111 is malware is below a second threshold, the malware status may be not malware, and the method 400 may continue at 420. If the first probability that the file 111 is malware is below the first threshold and above the second threshold, the malware status may be inconclusive, and the method 400 may continue at 430.

At 420, the malware status is associated with the file 111. The malware status that the file 111 is not malware is associated with the file 111 by the antimalware software 115.

At 425, the user or administrator is alerted. The user or administrator may be alerted by the antimalware software 115. Because the file 111 was labeled as malware, the antimalware software 115 may alert the user that the file 111 should not be executed and may recommend deleting the file 111. Alternatively, the antimalware software 115 may associate the malware status with the file 111, and later when the user tries to execute the file 111, the antimalware software 115 may warn or alert the user.

At 430, a second probability that the file 111 contains malware is determined using the dynamic malware model 170. The second probability may be determined by the dynamic detection algorithm 119 and the dynamic malware model 170 using dynamic features collected by the antimalware software 115 while the file 111 is executed. The determination may be triggered by the user executing the file 111.

At 435, the second probability and the file 111 are provided. The file 111 and the second probability may be provided by the antimalware software 115 to the antimalware server 103 through the network 190 as training data 117. In some embodiments, only static features of the file 111 and the second probability may be provided to the antimalware server 103.

At 440, an updated static malware model 160 is received. The updated static malware model 160 may be received by the antimalware software 115 from the antimalware server 103 through the network 190. The updated static model 160 may have been retrained by the server 103 using the training data 117 provided by the antimalware software 115 at 435, as well as training data 117 provided by other instances of the antimalware software 115.

Figure 5:
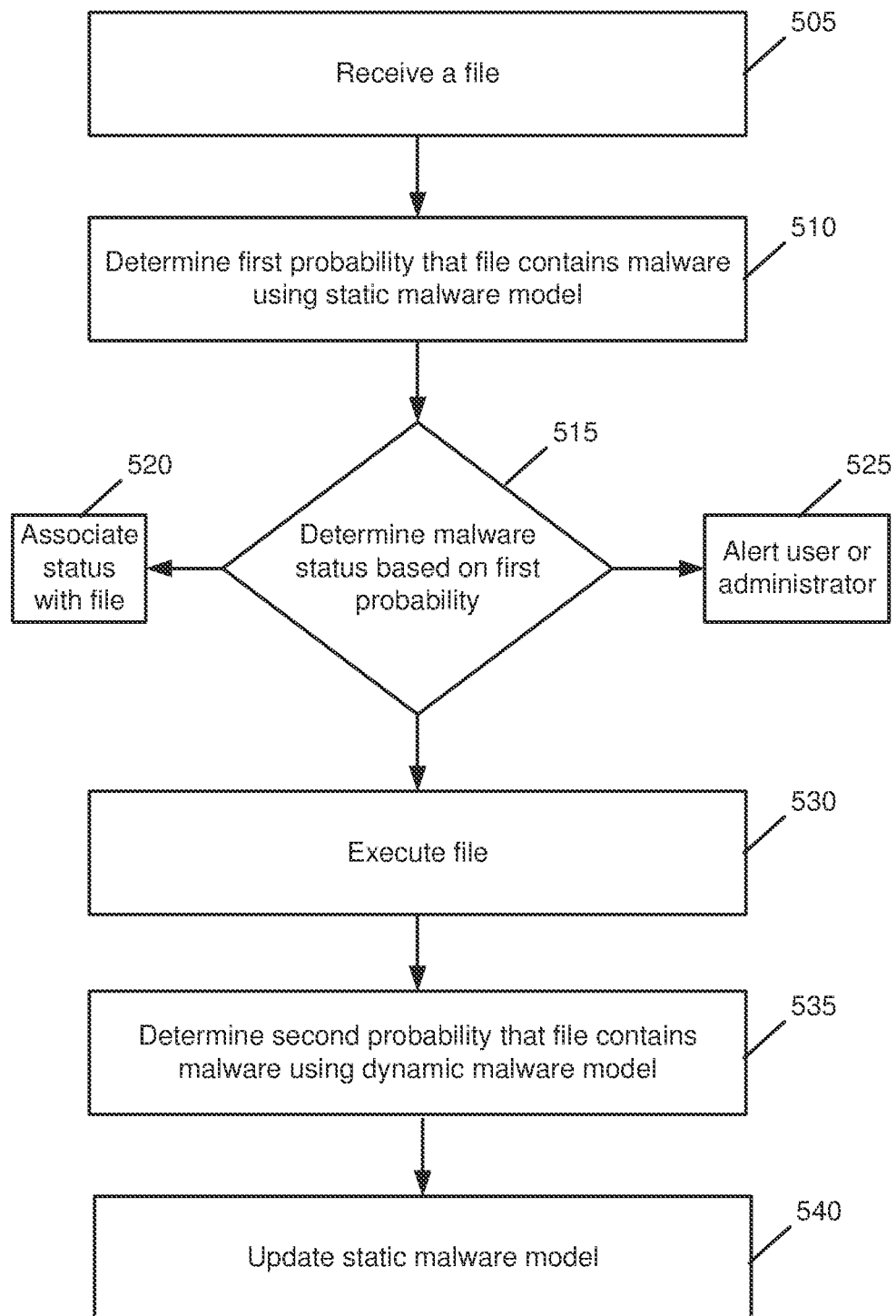
FIG. 5 is an illustration of an example method for detecting malware using a static malware model and a dynamic malware model.

FIG. 5 is an illustration of an example method for detecting malware using a static malware model 160 and a dynamic malware model 170 and for providing training data to update the static malware model 160. The method 500 may be implemented by the antimalware software 115 of a user device 110.

At 505, a file 111 is received. In some embodiments, the file 111 may be received by the user device 110 from a server through the network 190. A user of the user device 110 may have downloaded the file 111 to the user device 110 for future use or execution. Alternatively, the file 111 may be received from a variety of other sources including, but not limited to, physical storage devices (external HDDs, CDs, USB drives), file sharing applications, messaging applications, and web applications. Any file source may be supported.

At 510, a first probability that the file contains malware is determined using a static malware model 160. The first probability may be determined by the static detection algorithm 118 and the static malware model 160 using static features extracted from the file 111.

At 515, a malware status of the file 111 is determined. The malware status may be determined by the antimalware software 115 based on the first probability. If the first probability that the file 111 is malware is above a first threshold, the malware status may be malware, and the method 500 may continue at 525. If the first probability that the file 111 is malware is below a second threshold, the malware status may be not malware, and the method 500 may continue at 520. If the first probability that the file 111 is malware is below the first threshold and above the second threshold, the malware status may be inconclusive, and the method 500 may continue at 530.

At 520, the malware status is associated with the file 111. The malware status that the file 111 is not malware is associated with the file 111 by the antimalware software 115.

At 525, the user or administrator is alerted. The user or administrator may be alerted by the antimalware software 115. Because the file 111 was labeled as malware, the antimalware software 115 may alert the user that the file 111 should not be executed and may recommend deleting the file 111.

At 530, the file 111 is executed. The file 111 may be executed by the user device 110 in response to the user selecting the file 111 for execution. For example, the user may have clicked on a graphical representation of the file 111.

At 535, a second probability that the file 111 contains malware is determined using the dynamic malware model 170 in response to the user executing the file. The second probability may be determined by the dynamic detection algorithm 119 and the dynamic malware model 170 using dynamic features collected by the antimalware software 115 while the file 111 is executed.

At 540, the static malware model 160 is updated. The static malware model 160 may be updated by the antimalware server 103 using the determined second probability and the static features. The antimalware software 115 may have provided the determined second probability and the static features to the antimalware server 103 as training data 117.

Figure 6:
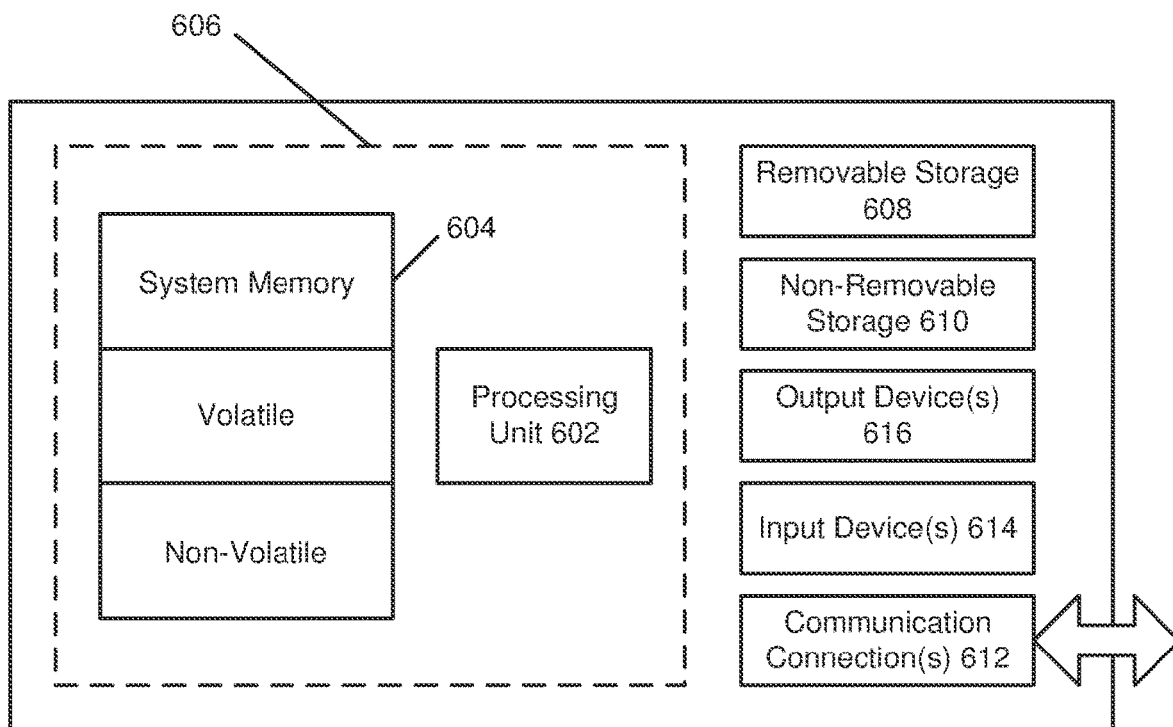
FIG. 6 shows an exemplary computing environment in which example embodiments and aspects may be implemented.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for detecting malware in files, the method comprising:
   receiving a file by a computing device through a network;
   determining a first probability that the file is malware using a first malware model, wherein the first malware model is a static malware model;
   based on the determined first probability, determining a malware status of the file by the computing device, wherein the malware status is one of malware, not malware, or inconclusive;
   when malware status of the file is inconclusive:
      executing the file by the computing device;
      determining a second probability that the file is malware based on the execution of the file using a second malware model by the computing device, wherein the second malware model is a dynamic malware model;
      providing at least a portion of the file and the second probability to a server through the network by the computing device; and
      receiving an updated version of the first model from the server by the computing device, wherein the updated version of the first model was trained using the file and the second probability.

2. The method of claim 1, wherein providing the file and the second probability to the server through the network comprises:
   extracting features from the file; and
   providing the extracted features from the file and the second probability to the server through the network.

3. The method of claim 1, wherein the first probability is determined in response to one or more of receiving the file and detecting that the user has selected the file.

4. The method of claim 1, further comprising:
   if the malware status of the file is malware, alerting a user.

5. The method of claim 1, wherein executing the file by the computing device comprises receiving an indication to execute the file from the user and executing the file in response to the indication.

6. The method of claim 1, wherein determining the malware status of the file comprises:

if the first probability is below a first threshold and below a second threshold, determining that the malware status is not malware;

if the first probability is above the first threshold and below the second threshold, determining that the malware status is inconclusive; and if the probability is above the first threshold and above the second threshold, determining that the malware status is malware.

7. A system for detecting malware in files, the system comprising:

at least one computing device; and a computer-readable medium storing computer-executable instructions that when executed by the at least one computing device cause the at least one computing device to:

receive a file;

determine a first probability that the file is malware using a first malware model, wherein the first malware model is a static malware model;

based on the determined first probability, determine a malware status of the file, wherein the malware status is one of malware, not malware, or inconclusive; and when malware status of the file is inconclusive:

execute the file by the computing device;

determine a second probability that the file is malware based on the execution of the file using a second malware model, wherein the second malware model is a dynamic malware model;

provide at least a portion of the file and the second probability to a server through the network; and receive an updated version of the first model from the server, wherein the updated version of the first model was trained using the file and the second probability.

8. The system of claim 7, wherein providing the file and the second probability to the server through the network comprises:

extracting features from the file; and providing the extracted features from the file and the second probability to the server through the network.

9. The system of claim 7, wherein the first probability is determined in response to one or more of receiving the file and detecting that the user has selected the file.

10. The system of claim 7, further comprising computer-executable instructions that when executed by the at least one computing device cause the at least one computing device to:

if the malware status of the file is malware, alert a user.

11. The system of claim 7, wherein executing the file by the computing device comprises receiving an indication to execute the file from the user and executing the file in response to the indication.

12. The system of claim 7, wherein determining the malware status of the file comprises:

if the first probability is below a first threshold and below a second threshold, determining that the malware status is not malware;

if the first probability is above the first threshold and below the second threshold, determining that the malware status is inconclusive; and if the probability is above the first threshold and above the second threshold, determining that the malware status is malware.

13. A non-transitory computer-readable medium storing computer-executable instructions that when executed by at least one computing device cause the at least one computing device to:

receive a file;

determine a first probability that the file is malware using a first malware model, wherein the first malware model is a static malware model;

based on the determined first probability, determine a malware status of the file, wherein the malware status is one of malware, not malware, or inconclusive; and when malware status of the file is inconclusive:

execute the file by the computing device;

determine a second probability that the file is malware based on the execution of the file using a second malware model, wherein the second malware model is a dynamic malware model;

provide at least a portion of the file and the second probability to a server through the network; and receive an updated version of the first model from the server, wherein the updated version of the first model was trained using the file and the second probability.

14. The non-transitory computer-readable medium of claim 13, wherein providing the file and the second probability to the server through the network comprises:

extracting features from the file; and providing the extracted features from the file and the second probability to the server through the network.

* * * * *